United States Patent Office 3,810,885
Patented May 14, 1974

3,810,885
NOVEL STEROIDS AND PROCESSES
Robert Bucourt, Paris, Andre Pierdet, Noisy-le-Sec, Jean-Claude Gasc, Bondy, and Lucien Nedelec, Clichy-sous-Bois, France, assignors to Roussel-UCLAF, Paris, France
No Drawing. Continuation-in-part of application Ser. No. 782,425, Dec. 9, 1968. This application Oct. 4, 1971, Ser. No. 186,483
Claims priority, application France, Dec. 12, 1967, 131,869
Int. Cl. C07c 173/00
U.S. Cl. 260—239.55 C           32 Claims

ABSTRACT OF THE DISCLOSURE

Novel 12$\beta$-alkyl-$\Delta^{4,9}$-gonadienes of the formula

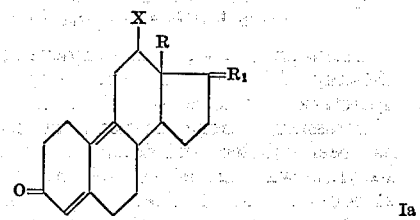

and 12-alkyl-$\Delta^{4,9,11}$-gonatrienes of the formula

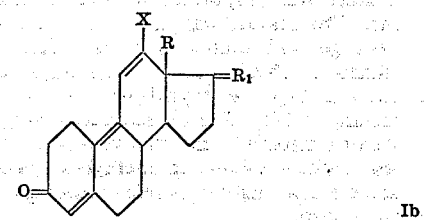

wherein R is alkyl of 1 to 3 carbon atoms, X is alkyl of 1 to 3 carbon atoms and $R_1$ is selected from the group consisting of

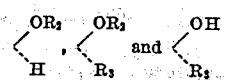

wherein $R_2$ is selected from the group consisting of hydrocarbyl of 1 to 10 carbon atoms and acyl of an organic carboxylic acid of 1 to 18 carbon atoms and $R_3$ is selected from the group consisting of saturated hydrocarbon of 1 to 6 carbon atoms and unsaturated hydrocarbon of 2 to 6 carbon atoms which compounds possess hormonal properties and to two novel processes for their preparation and novel intermediates therefor.

PRIOR APPLICATION

This application is a continuation-in-part of copending, commonly assigned application Ser. No. 782,425, filed Dec. 9, 1968.

STATE OF THE ART

Known $\Delta^{4,9,11}$-estratriene-3-ones have a marked type of androgenic and anabolic activity as reported by Th. Feyel-Cabannes [Annales d'Endocrinologie, vol. 26 (1965), p. 95] and Velluz et al. [C. R. Ac. Sci., vol. 264 (1967), p. 1396]. In particular, the 17$\alpha$-methyl-$\Delta^{4,9,11}$-estratriene-17$\beta$-ol-3-one is one of the most active androgenic and anabolic agents yet known. The compounds with an unsaturated side chain such as 17$\alpha$-ethynyl or 17$\alpha$-chloroethynyl derivatives have progestomimetic activity or hypophysial inhibiting activity without showing an estrogenic effect while the 17$\alpha$-vinyl derivative possess anabolic and androgenic activity (see U.S. Pat. No. 3,257,278). The $\Delta^{4,9,11}$-estratriene-3-ones form a family of compounds having strong androgenic or progestomimetic activity and lack estrogenic activity at the usual useful dosages.

French Pat. No. 1278933 describes $\Delta^{4,9}$-estradiene-17$\beta$-ol-3-ones which are unsubstituted in the 12-position but the said compounds are anabolic agents with little androgenic activity and certain of the said compounds possess a progestative and anti-estrogenic activity.

OBJECTS OF THE INVENTION

It is an object of the invention to provide the novel $\Delta^{4,9}$-gonatrienes of Formula Ia and the novel $\Delta^{4,9,11}$-gonatrienes of Formula Ib.

It is another object of the invention to provide novel intermediates for the compounds of Formulas Ia and Ib and to novel processes for the preparation of the said compounds.

It is another object of the invention to provide novel therapeutic compositions without any anabolic or progestative activity.

It is an additional object of the invention to provide a novel method of inducing antiandrogenic activity in warm blooded animals.

These and other objects and advantages of the invention will become obvious from the following detailed description.

THE INVENTION

The novel compounds of the invention are selected from the group consisting of novel 12$\beta$-alkyl-$\Delta^{4,9}$-gonadienes of the formula

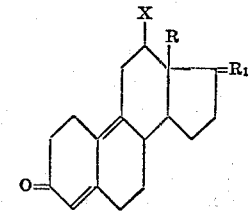

and 12-alkyl-$\Delta^{4,9,11}$-gonatrienes of the formula

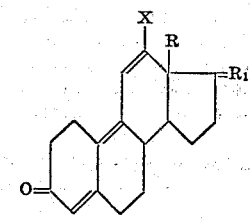

wherein R is alkyl of 1 to 3 carbon atoms, X is alkyl of 1 to 3 carbon atoms and $R_1$ is selected from the group consisting of

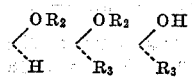

wherein $R_2$ is selected from the group consisting of hydrocarbyl of 1 to 10 carbon atoms and acyl of an organic carboxylic acid of 1 to 18 carbon atoms and $R_3$ is selected from the group consisting of saturated hydrocarbon of 1 to 6 carbon atoms and unsaturated hydrocarbon of 2 to 6 carbon atoms. Preferably, R and X are methyl, ethyl or n-propyl.

$R_3$ is preferably alkyl of 1 to 4 carbon atoms, cycloalkyl of 3 to 6 carbon atoms, alkenyl of 2 to 4 carbon atoms, phenyl and alkynyl and haloalkynyl of 2 to 4 carbon atoms. Specific groups are methyl, ethyl, propyl, cyclopropyl, cyclopentyl, cyclohexyl, vinyl, allyl, 2-methyl allyl, isobutenyl, ethynyl, 1-propynyl, 2-propynyl, 2-butynyl, butadiynyl, chloroethynyl and trifluoropropynyl.

$R_2$ may be a hydrocarbyl of 1 to 10 carbon atoms which may be lower alkyl such as methyl or ethyl; lower alkenyl such as vinyl, allyl or 2-methyl allyl; lower alkynyl such as propargyl; cycloalkyl of 5 to 7 carbons such as cyclopentyl; cycloalkenyl such as cyclopentenyl or cyclohexenyl; phenyl lower alkyl such as benzyl; heterocyclic such as tetrahydropyranyl; or a $CH_2OY$ wherein Y is lower alkyl such as methyl, propyl, lower alkenyl such as allyl, cycloalkyl alkyl such as cyclohexyl methyl or phenylalkyl such as benzyl.

Examples of suitable organic acids of 1 to 18 carbon atoms for $R_3$ may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelargonic acid, capric acid, undecyclic acid, lauric acid, myristic acid, palmitic acid and stearic acid; alkenoic acids, such as undecylenic acid and oleic acid, cycloalkyl carboxylic acids, such as cyclopentyl carboxylic acid, cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-terbutylfurane-2-carboxylic acid, 5-bromofurane-2-carboxylic acid and nicotinic acids; β-keto-alkanoic acids, such as acetylacetic acid, propionylacetic acid and butyryl-acetic acid; amino acids, such as diethylaminoacetic acid and aspartic acid.

Among the specific compounds of Formula Ia and Ib are 12β-methyl-17α-ethynyl-$\Delta^{4,9}$-estradiene-17β-ol-3-one, 12-methyl-13β-ethyl-17α-ethynyl-$\Delta^{4,9,11}$-gonatriene-17β-ol-3-one, 12-ethyl-17α-ethynyl-$\Delta^{4,9,11}$-estratriene-17β-ol-3-one, 12-methyl-17β-acetoxy-$\Delta^{4,9,11}$-estratriene-3-one, 12-methyl-17α-ethynyl-$\Delta^{4,9,11}$-estratriene-17β-ol-3-one and 12,17α-dimethyl-$\Delta^{4,9,11}$-estratriene-17β-ol-3-one.

The introduction of alkyl of 1 to 3 carbons in the 12 position of the molecule drastically modifies the pharmacological activity of the molecule. The substitution of 12-methyl in a compound of Formula Ib leads to a disappearance of androgenic or progestomimetic activity of the basic molecule and the appearance of a marked estrogenic activity as evidenced by estrogenic tests and which is manifested in male warm-blooded animals by an antiandrogenic activity. The appearance of estrogenic properties by the simple insertion of a 12-methyl group is therein unexpected since the insertion of a methyl in other positions such as 1 or 6 or 7 entrains either an enhancement or a relative attenuation of the androgenic activity.

The other compounds of Formula Ib and those of Formula Ia also possess estrogenic activity as well as hypophysial inhibiting activity which makes them antiovulation agents. They also show no androgenic activity in the Hershberger test and do not possess anti-androgenic activity when administered with testosterone propionate.

The estrogenic activity of compounds of Formula Ia and Ib make them useful for the treatment of insufficient estrogenic secretion and are useful in the treatment of retarded puberty or hypofolliculinia and in the treatment or prevention of biological and psychological effects of menopause.

One of the novel processes of the invention is the preparation of 12-X-13β-R-$\Delta^{4,9,11}$-gonatrienes of Formula Ib which comprises reacting a 13β-R-$\Delta^{4,9,11}$-gonatriene-17β-ol-3-one or its 17β-ester with a organometallic compound wherein the organo position is X as defined above to obtain the corresponding 12α-X-13β-R-$\Delta^{5(10),9(11)}$-gonadiene-17β-ol-3-one. This compound can be either: (a) reacted with oxygen to form the corresponding 11β-hydroperoxy-12α-X-13β-R-$\Delta^{5(10),9(11)}$-gonadiene-17β-ol-3-one, then reacted with a reducing agent to obtain the corresponding 12α-X-13β-R-$\Delta^{4,9}$-gonadiene-11β,17β-diol-3-one, reacting the latter with a dehydration agent to form the corresponding 12-X-13β-R-$\Delta^{4,9,11}$-gonatriene-17β-ol-3-one; either (b) directly oxydized by means of substituted p-benzoquinone in an inert solvent as described in U.S. Pat. 3,453,267 to form the corresponding 12-X-13β-R-$\Delta^{4,9,11}$-gonatriene-3-one. If desired the latter is reacted with hydroxylamine or O-lower alkylhydroxylamine to protect the 3-keto group and oxydized by means of a metallic oxydizing agent to form the corresponding 3-oximino-12-X-13β-R-$\Delta^{4,9,11}$-gonatriene-17-one. The latter is reacted with an organometallic reagent where the organo is $R_3$ to form the corresponding 3-oximino-12-X-13β-R-17-α-$R_3$-$\Delta^{4,9,11}$-gonatriene-17β-ol and the latter is subjected to acid hydrolysis or an exchange reaction with a carbonyl derivative to obtain the corresponding 12-X-13β-R-17α-$R_3$-$\Delta^{4,9,11}$-gonatriene-17β-ol-3-one which may be reacted with an esterification agent or an etherification agent to obtain the compounds of Formula Iβ with 17α-$OR_2$.

In a variation of the process, the 3-keto group of 12-X-13β-R-$\Delta^{4,9,11}$-gonatriene-17β-ol-3-one is protected by reaction with a ketalization agent to form the corresponding 3-K-12-$X_1$-13β-R-$\Delta^{5(10),9(11)}$-gonadiene-17-ol-wherein $X_1$ is the alkylidene of X and K is the ketal group, reacting the latter with an oxidation agent to form the corresponding 3-K-12-$X_1$-13β-R-$\Delta^{5(10),9(11)}$-gonadiene-17-one, reacting the latter with an organometallic compound wherein the organo group is $R_3$ to form the corresponding 3-K-12-$X_1$-13β-R-17α-$R_3$-$\Delta^{5(10),9(11)}$-gonadiene-17β-ol and subjecting the latter to acid hydrolysis to form the corresponding 12-X-13β-R-17α-$R_3$-$\Delta^{4,9,11}$-gonatriene-17β-ol-3-one which may be esterified or etherified in the 17-position.

The 13β-R-$\Delta^{4,9,11}$-gonatriene-17β-ol-3-ones, used as the starting material for the said process, are described in French Pat. No. 1380414 and No. 1574693 and Belgian Pat. No. 644,138.

The introduction of the 12-alkyl group into the 13β-R-$\Delta^{4,9,11}$-gonatriene-17α-ol-3-one is effected preferably with an alkyl magnesium halide of the formula X-Mg-Hal where X has the above definition and Hal is a halogen such as bromine or iodine or with an alkyl lithium of the formula XLi. The said reaction is most preferably effected in the presence of a cuprous halide such as cuprous chloride at a temperature below 0° C. Instead of the 17α-ol starting compound, the alkanoyl or aroyl ester such as the acetate, propionate or benzoate may be used. The mechanism of the reaction between the organometallic derivative and the unsaturated ketone of the steroid allows axial introduction of the X group to form the 12α-alkyl-gonadiene.

The formation of the 11β-hydroperoxy group is effected with pure oxygen or a mixture of gases containing oxygen such as air and is effected in a weakly basic media, notably in the presence of a tertiary aliphatic or cyclic amine such as pyridine or triethylamine.

The reduction of the 11-hydroperoxy is preferably effected with a lower alkyl phosphite such as trimethyl or triethyl phosphite in the presence of a lower alkanol such as ethanol or methanol. The reducing agent may also be an alkali metal iodide such as potassium iodide in the presence of acetic acid and also a dialkyl sulfide. The dehydration of 12α-X-13β-R-$\Delta^{4,9}$-gonadiene-11β,17β-diol may be effected with a strong mineral acid such as perchloric acid or sulfuric acid.

The protection of the 3-ketone group of 12-X-13β-R-$\Delta^{4,9,11}$-gonatriene-17β-ol-3-one may be effected with hydroxylamine or O-lower alkyl-hydroxylamine such as O-methylhydroxylamine to form the corresponding oxime or by formation of a ketal by reaction with a lower alkanol, lower alkylene glycol or a dioxolane in the presence of an acid catalyst. The ketalization is accompanied by an isomerization of the double bond system, $\Delta^{4,9,11}$, to form the deconjugated 12-alkylene compound which is made possible by the presence of the substituent in the 12-position.

The oxidation of the resulting 3-protected keto compound is effected in a basic or neutral media to prevent cleavage of the 3-protective group. The oxidation agent is preferably a ketone in the presence of an aluminum alcoholate by the Oppenauer method. The ketone may be a lower aliphatic ketone such as acetone, methyl ethyl ketone or methyl isobutenyl ketone or a cycloalkanone such as cyclohexanone. The aluminum alcoholate is preferably a trialkanolate of an aluminum derivative of a lower alkanolate such as aluminum isopropylate or tert.-butylate.

The oxidation of the 3-oximino-12-X-13$\beta$-R-$\Delta^{4,9,11}$-gonatriene-17-one is preferably effected with a metallic oxide in the presence of pyridine.

The introduction of the 17$\alpha$-R$_3$ group is effected with an organo metallic reactant of the formula R$_3$-Mg-Hal where R$_3$ and Hal have the above definitions or an alkali metal derivative of the formula R$_3$-M where M is an alkali metal such as lithium, sodium or potassium.

To introduce a 17$\alpha$-alkynyl group, the reactant is an alkynyl magnesium halide such as ethynyl magnesium halide or an alkynyl alkali metal such as alkali metal acetylides. When 13$\beta$-R is an ethyl or propyl group, it is preferred to use an alkynyl alkali metal such as potassium acetylide formed by bubbling acetylene through a potassium alkanolate solution such as potassium tert.-butylate or with liquid ammonia containing potassium amide.

The regeneration of the 3-keto group is effected with acid hydrolysis with an organic sulfonic or carboxylic acid or a mineral acid in the presence of water such as aqueous hydrochloric acid or acetic acid. The 3-oximino group is preferably cleaved by exchange with an acid carbonyl such as glyoxylic acid or pyruvic acid.

The process of the invention for the preparation of a compound of Formula Ia comprises reacting a 12-X-13$\beta$-R-$\Delta^{4,9,11}$-gonatriene-17$\beta$-ol-3-one with hydrogen in the presence of a catalyst to form the corresponding 12$\beta$-X-13$\beta$-R-$\Delta^{4,9}$-gonadiene-17$\beta$-ol-3-one, reacting the latter with a protecting group to form the corresponding 3-K-12-X-13$\beta$-R-$\Delta^{5(10),9(11)}$-gonadiene-17$\beta$-ol, reacting the latter with an oxidation gonadiene-17$\beta$-ol, reacting the latter with an organo metallic derivative wherein the organo is R$_3$ to form the corresponding 3 - K - 12 - X - 13$\beta$-R-17$\alpha$-R$_3$-$\Delta^{5(10),9(11)}$-gonadiene-17$\beta$-ol and reacting the latter with an acid or effecting an exchange reaction with a carbonyl derivative to form the corresponding 12-X-13$\beta$-R-17$\alpha$-R$_3$-$\Delta^{4,9}$-gonadiene-17$\beta$-ol-3-one of Formula Ia which will be etherified or esterified.

The starting materials for the second process are produced as intermediates in the preparation of compounds of Formula Ib. When X and R are methyl, the compounds are described in French BSM No. 6684M.

The hydrogenation of the 12-X-13$\beta$-R-$\Delta^{4,9,11}$-gonatriene-17$\beta$-ol-3-one is preferably effected with a catalyst based on palladium, platinum, ruthenium, rhodium or nickel. To insure the selectivity of the hydrogenation, the catalysts are partially deactivated such as by treatment with a heavy metal salt such as a salt of lead, bismuth or copper or by the addition of a nitrogen base such as pyridine, quinoline or triethylamine or by a combination of the two techniques.

The nickel based catalyst such as Raney nickel can be partially deactivated by treatment with an acid such as acetic acid. The hydrogenation of the steroid double bonds made at the $\alpha$-position results in the formation of the 12$\beta$-alkyl gonadiene.

The 12$\beta$-alkyl configuration of the hydrogenation reaction product proves to be valuable in later stages for ethynylation in the 17$\alpha$-position. In effect, study of the molecular model shows that the presence of a 12$\alpha$-alkyl substituent impedes the introduction of a 17$\alpha$-substituent which has been confirmed by experiments. The differences in the chemical and physical properties of the 12-alkyl-$\Delta^{5(10),9(11)}$-gonadienes produced by hydrogenation and the 12-alkyl-$\Delta^{5(10),9(11)}$-gonadienes produced by the above described alkylation reaction confirms that the latter has the 12$\alpha$-alkyl configuration.

The primary product of the hydrogenation is 12$\beta$-X-13$\beta$-R-$\Delta^{5(10),9(11)}$-gonadiene-17$\beta$-ol-3-one but the hydrogenation catalysts may also result in isomeration of the unsaturated compounds to obtain in variable proportions with certain catalysts the conjugated ketone, 12$\beta$-X-13$\beta$-R-$\Delta^{4,9}$-gonadiene-17$\beta$-ol-3-one. It is possible from the synthesis to obtain either of the said isomers or a mixture thereof.

The step of protection of the 3-keto group which follows the hydrogenation is sometimes more difficult to effect on the $\Delta^{4,9}$-gonadiene than the $\Delta^{5(10),9(11)}$-gonadiene. Therefore the preferred catalyst is one which gives exclusively or predominantly the $\Delta^{5(10),9(11)}$-gonadiene isomer which is a palladium based catalyst partially deactivated with a lead salt, preferably lead acetate. Such a catalyst is described by Lindlar [Helv., vol. 35 (1952), p. 446].

The protection of the 3-keto group may be effected by formation of a ketal or an oxime as discussed above. The formation of the 3-ketal also will isomerize the $\Delta^{4,9}$-bond to the $\Delta^{5(10),9(11)}$-system so both of the isomers resulting from the hydrogenation give the same products. The formula of an oxime is not accompanied by an isomerization of the conjugated double bond so that the product will be either 3-K-12-methyl-13$\beta$-R-$\Delta^{4,9}$-gonadiene-17$\beta$-ol- or 3-K-12-methyl-13$\beta$-R-$\Delta^{5(10),9(11)}$-gonadiene-17$\beta$-ol or a mixture thereof depending upon the hydrogenation product.

The oxidation of the 17-hydroxyl group and the introduction of the 17$\alpha$-R$^3$ group may be effected as discussed previously.

The acid hydrolysis of the ketal of the 3-K-12-methyl-13$\beta$-R-17$\alpha$-R$_3$-$\Delta^{5(10),9(11)}$-gonadiene-17$\beta$-ol has to be effected with a strong acid for simultaneous hydrolysis and isomerization of the double bonds to the $\Delta^{4,9}$-system. For example, sulfuric acid or hydrochloric acid in a lower alkanol or perchloric acid in acetic acid may be used. Also suitable are a sulfonic acid such as p-toluene sulfonic acid or sulfonic resins in the acid form such as commercial polystyrene sulfonic acid or styrene-divinyl benzene sulfonic polymers. When the 3-keto group is protected as an oxime, the hydrolysis is effected with an aqueous mineral or organic acid or by exchange with a carbonyl such as pyruvic acid, glyoxylic acid, glyoxal or formal.

The esterification of the compounds of Formula Ia or Ib may be effected by the usual methods by reaction with a functional derivative of the acid such as the acid chloride or anhydride. The esterification can be effected on the compound of Formula Ia or Ib or before regeneration of the 3-keto group as described in French Pat. No. 1,492,985.

The novel intermediates of the invention have the following formula.

(A)

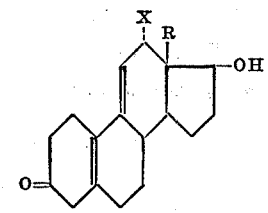

wherein R and X have the above definitions such as 12$\alpha$-methyl-$\Delta^{5(10),9(11)}$-estradiene-17$\beta$-ol-3-one and 12$\alpha$-methyl-13$\beta$-ethyl-$\Delta^{5(10),9(11)}$-gonadiene-17$\beta$-ol-3-one.

(B) 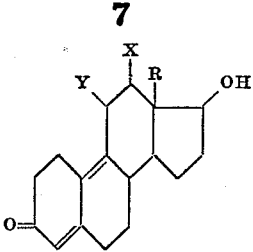

wherein X and R have the above definitions and Y is hydroperoxy or hydroxy such as 12α-ethyl-11β-hydroperoxy-Δ⁴,⁹-estradiene-17β-ol-3-one, 12a-methyl-11β-hydroperoxy-13β-ethyl-Δ⁴,⁹-gonadiene-17β-ol-3-one, 12α - ethyl-Δ⁴,⁹-estradiene-11β, 17β-diol-3-one and 12α-methyl-13β-ethyl-Δ⁴,⁹-gonadiene-11β, 17β-diol-3-one.

(C) 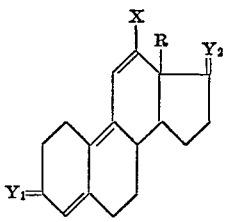

wherein R and X have the above definitions, $Y_1$ is oxygen when

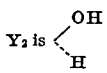

or $Y_1$ is =NOZ when

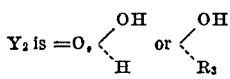

Z is lower alkyl or hydrogen and $R_3$ has the above definitions such as 12-ethyl-Δ⁴,⁹,¹¹-estratriene-17β-ol-3-one, 12-methyl-13β-ethyl-Δ⁴,⁹,¹¹-gonatriene-17β - ol - 3 - one, 3-methyloximino-12-ethyl-Δ⁴,⁹,¹¹-estratriene-17β-ol-3 - methyloximino 12-ethyl-Δ⁴,⁹,¹¹-estratriene-17-one and 3-methyloximino-12-ethyl-17β-ethynyl-Δ⁴,⁹,¹¹-estratriene-17β-ol.

(D) 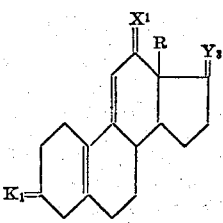

wherein $X^1$ and R are defined as above, $K_1$ is a ketal group and

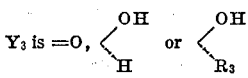

and $R_3$ is as above such as 3,3-ethylenedioxy-12-methylene-13β-ethyl-Δ⁵(¹⁰),⁹(¹¹)-gonadiene - 17β - ol, 3,3-ethylenedioxy-12-methylene - 13β - ethyl-Δ⁵(¹⁰),⁹(¹¹)-gonadiene-17-one and 3,3 - ethylenedioxy-12-methylene-13β-ethyl-Δ⁵(¹⁰),⁹(¹¹)-gonadiene-17β-ol (E) 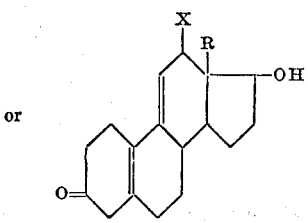

wherein R and X have the above definitions such as 12β-methyl-Δ⁵(¹⁰),⁹(¹¹)-estratriene-17β-ol-3-one and (F) 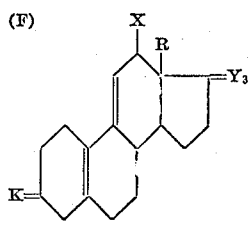

wherein X and R have the above definitions, K is a protective group for a ketone and

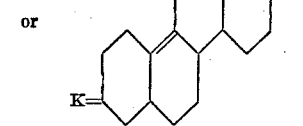

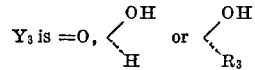

wherein $R_3$ is as above such as 3,3-ethylenedioxy-12β-methyl-Δ⁵(¹⁰),⁹(¹¹) - estradiene - 17β - ol, 3,3-ethylenedioxy-12β-methyl - Δ⁵(¹⁰),⁹(¹¹) - estradiene-17-one and 3,3-ethylenedioxy-12β-methyl - 17α - ethynyl-Δ⁵(¹⁰),⁹(¹¹)-estradiene-17β-ol.

The novel estrogenic compositions of the invention are comprised of an effective amount of a compound selected from the group consisting of a compound of Formula Ia and a compound of Formula Ib and a major amount of a pharmaceutical carrier. The usual useful daily dose is 0.02 to 2.5 mg. in the adult depending upon the mode of administration. The compositions may be in the form of injectable solutiions or suspensions in multi-dose flacons or ampules, tablets, coated tablets, sublingual tablets, suppositories, pomades or creams prepared in the usual manner.

The novel method of inducing estrogenic activity in warm-blooded animals comprises administering to warm-blooded animals a safe and effective amount of at least one compound selected from the group consisting of Formula Ia and Formula Ib. The compounds may be administered orally, perlingually, topically, transcutaneously or rectally. The usual daily dose is 0.4 to 50 μg./kg.

In the following examples there are described several preferred embodiments to illustrate the invention. However, it should be understood that the invention is not intended to be limited to the specific embodiments.

EXAMPLE I

Preparation of 12-methyl-17β-acetoxy-Δ⁴,⁹,¹¹-estratriene-3-one

Step A: 12α-methyl-Δ⁵(¹⁰),⁹(¹¹)-estradiene-17β-ol-3-one 0.94 gm. of cuprous chloride was introduced into 300 cc. of 0.8 N solution of methylmagnesium bromide in tetrahydrofuran and 300 cc. of tetrahydrofuran while maintaining a temperature of —2° C. under a nitrogen atmosphere and 15 gm. of Δ⁴,⁹,¹¹-estratriene-17β-ol-3-one (described in French Pat. No. 1380414) were added thereto. The reaction mixture was stirred for 2 hours at 0° C. and then one liter of N-hydrochloric acid was added thereto. The reaction mixture was extracted with methylene chloride and the organic phase was washed with water was neutral, dried over sodium sulfate and evaporated to dryness. The 18 gm. of residue was purified by chromatography over silica gel with elution by a 1:1 mixture of benzene-ethyl acetate which eluate was evaporated to dryness. The residue was crystallized from ether to obtain 8.28 gm. of 12α-methyl-Δ⁵(¹⁰),⁹(¹¹)-estradiene-17β-ol-3-one having a melting point of 155° C. The product occurred in the form of colorless needles soluble in the usual organic solvents and insoluble in water.

U.V. Spectrum in ethanol:

maximum at 240–241 mμ;

$E^{1\%}_{1cm.} = 710$; $\epsilon = 20300$ infl. towards 250 mμ;

$E^{1\%}_{1cm.} = 471$

As far as is known, the product is not described in the literature.

Step B: 12-methyl-Δ$^{4,9,11}$-estratriene-17β-ol-3-one 7.8 gm. of 12α-methyl-Δ$^{5(10),9(11)}$-estradiene-17β-ol-3-one were dissolved in 390 cc. of benzene with stirring and after the addition of 10 gm. of dichloro-dicyano-benzoquinone, the reaction mixture was stirred for 3½ hours at room temperature under a nitrogen atmosphere. The reaction mixture was filtered and the filtrate was washed with an aqueous 0.1 N solution of sodium thiosulfate, then with water, dried over sodium sulfate and evaporated to dryness under vacuum to obtain 3.721 gm. of crude 12α-methyl - Δ$^{4,9,11}$ - estratriene-17α-ol-3-one. Treatment of the precipitate with 0.5 liter of 5 N sodium hydroxide and 0.5 liter of 0.1 N sodium thiosulfate solution and extraction wiith benzene gave a second yield of 0.407 gm. of the 12-methyl derivative. The product was purified by chromatography over silica gel and elution with a 1:1 mixture of benzene-ethyl acetate. The eluate was evaporated to dryness and residue was empasted in isopropyl ether to obtain 12-methyl-Δ$^{4,9,11}$-estratriene-17β-ol-3-one having a melting point of 145° C.

The product which was colorless was soluble in acetone, benzene and chloroform slightly soluble in alcohol and ether and insoluble in water.

Ultraviolet Spectrum in ethanol:

max. at 244 mμ

$$E_{1cm.}^{1\%}=232$$

max. at 269–270 mμ

$$E_{1cm.}^{1\%}=127$$

max. at 283–284 mμ

$$E_{1cm.}^{1\%}=130$$

infl. towards 299–300 mμ

$$E_{1cm.}^{1\%}=171$$

max. at 357 mμ

$$E_{1cm.}^{1\%}=1030; \epsilon=29300$$

As far as is known, this compound is not described in the literature.

Step C: 12-methyl-17β-acetoxy-Δ$^{4,9,11}$-estratriene-3-one 0.82 gm. of 12-methyl-Δ$^{4,9,11}$-estratriene-17β-ol-3-one was introduced into 4 cc. of pyridine and after the addition of 2 cc. of acetic acid anhydride thereto, the reaction mixture was stirred at room temperature for 15 hours. The mixture was poured into a water-ice mixture and was extracted with methylene chloride. The organic phase was washed with water, dried over sodium sulfate and evaporated to dryness to obtain 0.993 gm. of raw 12-methyl - 17β - acetoxy-Δ$^{4,9,11}$-estratriene-3-one. The raw product was purified by chromatography over silica gel and elution with a 7:3 mixture of benzene-ethyl acetate.

The product which was a colorless solid was soluble in alcohol, ether, acetone, benzene and chloroform and insoluble in water.

U.V. Spectrum in ethanol:

max. at 242 mμ

$$E_{1cm.}^{1\%}=206$$

max. at 267–270 mμ

$$E_{1cm.}^{1\%}=107$$

infl. towards 285 mμ

$$E_{1cm.}^{1\%}=118$$

max. at 350–351 mμ

$$E_{1cm.}^{1\%}=861; \epsilon=28100$$

I.R. Spectrum (chloroform):

acetate at 1727 cm.$^{-1}$
conjugated ketone:
    complex band at 1662 cm.$^{-1}$ and 1647 cm.$^{-1}$
    band at 1606 cm.$^{-1}$
    complex band at 1574 cm.$^{-1}$ As far as is known, this product is not described in the literature.

EXAMPLE II

Preparation of 12,17α-dimethyl-Δ$^{4,9,11}$-estratriene-17β-ol-3-one

Step A: preparation of 3-oximino-12-methyl-Δ$^{4,9,11}$-estratriene-17β-ol 8.3 gm. of 12-methyl-Δ$^{4,9,11}$-estratriene-17β-ol-3-one (of Example I) were dissolved in 220 cc. of ethanol and a solution of 24.5 gm. of sodium acetate and 11.4 g. of hydroxylamine hydrochloride in 115 cc. of water was added thereto. The mixture was refluxed for 2 hours under a nitrogen atmosphere with stirring. After cooling the reaction mixture, it was added to a mixture of water and ice and after stirring for 30 minutes, the mixture was filtered. The precipitate was washed with water and dried at 60° C. to obtain 8.6 gm. of 3-oximino-12-methyl-Δ$^{4,9,11}$-estratriene-17β-ol in the form of pale yellow crystals having a melting point of 120–130° C. The product was soluble in ethanol and chloroform and insoluble in water. The compound was obtained as a mixture of syn and anti oximes.

U.V. Spectrum in ethanol:

max. at 237–238 mμ

$$E_{1cm.}^{1\%}=117$$

max at 328 mμ

$$E_{1cm.}^{1\%}=1160; \epsilon=34700$$

infl. towards 335 mμ

$$E_{1cm.}^{1\%}=1125$$

I.R. Spectrum (chloroform):

absence of C=O conjugate
presence of OH free (oxime) at 3580 cm.$^{-1}$
presence of conjugated C=C at 1601 and 1578 cm.$^{-1}$ As far as is known, this compound has not been described in the literature.

Step B: 3-oximino-12-methyl-Δ$^{4,9,11}$-estratriene-17-one 6.8 gm. of 3-oximino-12-methyl-Δ$^{4,9,11}$-estratriene-17β-ol were dissolved in one liter of toluene and 130 cc. of cyclohexanone at reflux under a nitrogen atmosphere with stirring and then 20 cc. of solvent was evaporated off. A solution of 30 gm. of aluminum isopropylated in 2 liters of toluene was added to the reaction mixture while distilling off 2 liters of solvent. After the addition of 200 cc. of water, excess cyclohexanone was entrained as a vapor over a period of 1½ hours. After cooling the mixture, 200 cc. of methylene chloride was added thereto, the alumina was filtered, and the filter washed with methylene chloride. The organic phase was washed with water and the aqueous phase was re-extracted with methylene chloride and the combined organic phases were evaporated to dryness. The residue was chromatographed over silica gel and elution with chloroform containing 20% of acetone to obtain 4 gm. of 3-oximino-12-methyl-Δ$^{4,9,11}$-estratriene-17-one in the form of orange crystals having a melting point of 210–220° C. The product was soluble in alcohol and chloroform and insoluble in water.

I.R. Spectrum (chloroform):
presence of cyclopentanone at 1725 cm.$^{-1}$
presence of oxime
presence of conjugated C=C at 1570 and 1598 cm.$^{-1}$ U.V. Spectrum (ethanol):
max. at 237 m$\mu$
$$E_{1cm.}^{1\%} = 115$$
infl. towards 310 m$\mu$
$$E_{1cm.}^{1\%} = 838$$
max. at 325 m$\mu$
$$E_{1cm.}^{1\%} = 1145; \epsilon = 34000$$
infl. towards 334 m$\mu$
$$E_{1cm.}^{1\%} = 1055$$

As far as is known, this product is not described in the literature.

Step C: 3-oximino-12,17$\alpha$-dimethyl-$\Delta^{4,9,11}$-estratriene-17$\beta$-ol 650 cc. of 2 M methyl magnesium bromide solution in ether was stirred under a nitrogen atmosphere while adding thereto a solution of 3.7 gm. of 3-oximino-12-methyl-$\Delta^{4,9,11}$-estratriene-17-one in 225 cc. benzene and the resulting mixture was refluxed for two hours. After cooling the mixture, one liter of a saturated aqueous ammonium chloride solution was added thereto. The phases were decanted and the aqueous phase was extracted with ethyl acetate. The organic phases were washed with water, dried and evaporated to dryness. The residue was chromatographed on silica gel with elution with chloroform containing 20% acetone to contain 3.3 gm. of 3-oximino-12,17$\alpha$-dimethyl-$\Delta^{4,9,11}$-estratriene-17$\beta$-ol in the form of yellow crystals having a melting point of about 230° C. The product was soluble in alcohol and insoluble in water.

Analysis: $C_{20}H_{27}O_2N$; molecular weight=313.44. Calculated (percent): N, 4.67. Found (percent): N, 4.0.

U.V. Spectrum (ethanol):
max. at 338–339 m$\mu$
$$E_{1cm.}^{1\%} = 107$$
infl. towards 312 m$\mu$
$$E_{1cm.}^{1\%} = 873$$
max. at 327 m$\mu$
$$E_{1cm.}^{1\%} = 1180; \epsilon = 37000$$
infl. towards 335 m$\mu$
$$E_{1cm.}^{1\%} = 1130$$

As far as is known, this product has not been described in the literature.

Step D: 12,17$\alpha$-dimethyl-$\Delta^{4,9,11}$-estratriene-17$\beta$-ol-3-one 3.1 gm. of 3-oximino-12,17$\alpha$-dimethyl-$\Delta^{4,9,11}$-estratriene-17$\beta$-ol were introduced with stirring under a nitrogen atmosphere into a mixture of 120 cc. of acetic acid, 120 cc. of water and 12 cc. of pyruvic acid and the resulting mixture was refluxed for 1 hour. After cooling, the reaction mixture was added to a mixture of 1.5 liters of water, 200 gm. of sodium bicarbonate and 200 cc. of ether. The organic phase was decanted off and was washed with water until the wash waters were neutral. The aqueous phase was reextracted with ethyl acetate and the combined organic phases were evaporated to dryness. The residue was dissolved in methylene chloride containing 20% ether and the solution was passed over a silica gel column and elution with methylenechloride containing 15% ether gave 1.9 gm. of 12,17$\alpha$-dimethyl-$\Delta^{4,9,11}$-estratriene-17$\beta$-ol-3-one having a melting point of 156° C. and a specific rotation $[\alpha]_D^{20} = -140° \pm 2°$ (c.=1% in chloroform). The product was soluble in alcohol and chloroform and insoluble in water.

Analysis: $C_{20}H_{26}O_2$; molecular weight 298.42. Calculated (percent): C, 80.49; H, 8.75. Found (percent): C, 80.3; H, 8.8.

I.R. Spectrum (chloroform):
presence of OH at 3610 cm.$^{-1}$
presence of C=O+conjugated C=C at 1661, 1651, 1649, 1635, 1600 and 1568 cm.$^{-1}$ U.V. Spectrum (ethanol):
max. at 245 m$\mu$
$$E_{1cm.}^{1\%} = 224$$
max. at 270 m$\mu$
$$E_{1cm.}^{1\%} = 119$$
max. at 285 m$\mu$
$$E_{1cm.}^{1\%} = 122$$
max. 355 m$\mu$
$$E_{1cm.}^{1\%} = 1035; \epsilon = 30900$$

As far as is known, this product is not described in the literature.

EXAMPLE III

Preparation of 12-methyl-17$\alpha$-ethynyl-$\Delta^{4,9,11}$-estratriene-17$\beta$-ol-3-one Step A: 3-oximino-12-methyl-17$\alpha$-ethynyl-$\Delta^{4,9,11}$-estratriene-17$\beta$-ol A current of acetylene was passed through a solution of 30 gm. of potassium tert.-butylate and 600 cc. of tetrahydrofuran cooled to 5° C., 10° C. for 1 hour and 15 minutes. After the addition of 5.4 gm. of 3-oximino-12-methyl-$\Delta^{4,9,11}$-estratriene-17-one in solution in 120 cc. of tetrahydrofuran thereto, the passage of acetylene through the mixture was continued for 1½ hours. 600 cc. of saturated aqueous sodium chloride solution were added to the reaction mixture. The organic phase was decanted off and the aqueous phase was re-extracted. The combined organic phases were washed with water, dried and evaporated to dryness to obtain 5.7 gm. of raw product. The raw product was purified by chromatography on silica gel and elution with a 8:2 mixture of chloroformacetone to obtain 2.2 gm. of 3-oximino-12-methyl-17$\alpha$-ethynyl-$\Delta^{4,9,11}$-estratriene-17$\beta$-ol which was used as is for the next step.

I.R. Spectrum (chloroform):
presence of OH at 3520 cm.$^{-1}$
presence of C≡C at 3290 cm.$^{-1}$ U.V. Spectrum (ethanol):
max. at 238 m$\mu$
$$E_{1cm.}^{1\%} = 98$$
max. at 327 m$\mu$
$$E_{1cm.}^{1\%} = 1065; \epsilon = 34450$$
infl. towards 334 m$\mu$
$$E_{1cm.}^{1\%} = 1035$$

As far as is known, this product is not described in the literature.

Step B: 12-methyl-17$\alpha$-ethnnyl-$\Delta^{4,9,11}$-estratriene-17$\beta$-ol-3-one 2.2 gm. of 3-oximino-12-methyl-17$\alpha$-ethynyl-$\Delta^{4,9,11}$-estratriene-17$\beta$-ol were introduced into a mixture of 90 cc. of water, 90 cc. of acetic acid and 9 cc. of pyruvic acid and the mixture was refluxed for 1 hour. After cooling the reaction mixture to room temperature, it was neutralized with sodium bicarbonate and then extracted with ethyl acetate. The organic phase was washed with a saturated aqueous solution of sodium bicarbonate and then with water. The aqueous phase was re-extracted with ethyl acetate and the combined organic phases were dried and evaporated to dryness to obtain 1.74 gm. of raw product. The raw product was purified by chromatography over silica gel and elution with methylene chloride and recrystallization from ethanol to obtain 702 mg. of 12-methyl-17α-ethynyl-Δ$^{4,9,11}$-estratriene-17β-ol-3-one having a melting point of first 188° C. and then 215° C. and a specific rotation $[α]_D^{20}$ = −39° (c.=0.47% in chloroform). The product was soluble in alcohol and insoluble in water.

Analysis: $C_{21}H_{24}O_2$; molecular weight=308.42. Calculated (percent): C, 81.78; H, 7.84. Found (percent): C, 81.7; H, 7.5.

I.R. Spectrum:

presence of OH at 3590 cm.−1
presence of C≡CH at 3293 cm.−1
presence of complex C=O at 1,659, 1,651 and 1,643 cm.−1
presence of C=C at 1602 and 1568 cm.−1

U.V. Spectrum (ethanol): Max. at 355 mμ; ε=30,400.

As far as is known, this product has not been described in the literature.

EXAMPLE IV

Preparation of 12β-methyl-17α-ethynyl-Δ-$^{4,9}$-estradiene-17β-ol-3-one

Step A: 12β-methyl-Δ$^{5(10),9(11)}$-estradiene-17β-ol-3-one 4.5 g. of alumina with 5% of palladium treated with lead acetate by the Lindlar method were suspended in 1.125 liters of pyridine and the suspension was saturated with hydrogen, 11.25 g. of 12-methyl-Δ$^{4,9,11}$-estratriene-17β-ol-3-one was added to the suspension under a nitrogen atmosphere and the mixture was hydrogenated for 24 hours at 27° C. Another 4.5 g. of said alumina catalyst were added to the mixture which was hydrogenated for another 24 hours. The mixture was filtered and the filter was washed with methylene chloride. The filtrate was distilled to dryness under reduced pressure and the residue was chromatographed over silica and eluated with a 4:1 mixture of ether-petroleum ether. The eluate was evaporated to dryness to obtain 8.445 of 12β-methyl-Δ$^{5(10),9(11)}$-estradiene-17β-ol-3-one melting at 130-133° C. The product occurred as a colorless solid soluble in chloroform and ethanol and insoluble in water.

I. R. Spectrum (choloroform): Presence of non-conjugated ketone at 1714 and 1721 cm.−1

U.V. Spectrum (ethanol):

inflex. towards 239 nm.

$E_{1cm}^{1\%}$ = 616 max. at 242 nm.

$E_{1cm}^{1\%}$ = 628; ε=18,000 inflex. towards 250 nm.

$E_{1cm}^{1\%}$ = 458

Step B: 3,3-ethylene dioxy-12β-methyl-Δ-estradiene-17β-ol-3-one

A mixture of 8.445 g. of 12β-methyl-Δ$^{5(10),9(11)}$-estradiene-17β-ol-3-one, 340 cc. of choloroform, 42 cc. of ethylene glycol and 8.445 g. of pyridine hydrochloride was refluxed for 16 hours under a nitrogen atmosphere and the reaction mixture was then added to a saturated aqueous sodium bicarbonate solution. The mixture was extracted with methylene chloride and the organic phase was washed with water, dried over sodium sulfate, filtered and evaporated to dryness under reduced pressure to obtain 7.95 g. of 3,3-ethylenedioxy-12β-methyl-Δ$^{5(10),9(11)}$-estradiene-17β-ol-3-one melting at 88° C. The colorless solid was soluble in chloroform and ethanol and insoluble in water.

I.R. Spectrum (cholorform): Presence of C=C at 1634 and 1620 cm.−1 and OH at 3609 cm.−1 and ketal U.V. Spectrum (ethanol):

max. at 238 nm.

$E_{1cm}^{1\%}$ = 531 max. at 244 nm.

$E_{1cm}^{1\%}$ = 581; ε=19,200 inflex. towards 253 nm.

$E_{1cm}^{1\%}$ = 374 inflex. towards 278 nm.

$E_{1cm}^{1\%}$ = 5 inflex. towards 286 nm.

$E_{1cm}^{1\%}$ = 4

R.M.N. Spectrum (Deutero chloroform): 18-methyl at 38-Hz., K-methyl at 59–66 Hz., 11-hydrogen at 312 Hz. and ketal at 238 Hz.

Step C: 3,3-ethylenedioxy-12β-methyl-Δ$^{5(10),9(11)}$-estradiene-17-one

A mixture of 7.75 g. of 3,3-ethylenedioxy-12β-methyl-Δ$^{5(10),9(11)}$-estradiene-17β-ol, 272 cc. of toluene and 77.5 of cyclohexanone was distilled under a nitrogen atmosphere to remove about 40 cc. of toluene and then a solution of 7.22 g. of aluminum isopropylate in 233 cc. of toluene was added while keeping the volume constant. Reflux was maintained for 50 minutes and the reaction mixture was then added to a solution of 31 g. of sodium and potassium tartrate in 250 cc. of water. The solvents were entrained with water vapor and the mixture was cooled and extracted with methylene chloride. The organic phase was washed with water, dried over sodium sulfate, filtered and evaporated to dryness. The residue was chromatographed over silica and elution was with a 1:1 mixture of ether and petroleum ether. The eluate was evaporated to dryness to obtain 5.72 g. of 3,3-ethylenedioxy-12β-methyl-Δ$^{5(10),9(11)}$-estradiene-17-one melting at 111–112° C. The colorless crystalline solid was soluble in chloroform and ethanol and insoluble in water.

I. R. Spectrum (chloroform): Presence of C=C at 1641 cm.−1 and 1608 cm.−1, 17-oxo at 1726 cm.−1 and ketal U.V. Spectrum (ethanol):

inflex. towards 230 nm.

$E_{1cm}^{1\%}$ = 474 max. at 238 nm.

$E_{1cm}^{1\%}$ = 620 max. at 243 nm.

$E_{1cm}^{1\%}$ = 653; ε=21,450

Step D: 3,3-ethylenedioxy-12β-methyl-17α-ethynyl-Δ$^{5(10),9(11)}$-estradiene-17β-ol A current of acetylene was passed through a solution of 364 mg. of potassium tert-butylate in 7.3 cc. of tetrahydrofuran cooled to 5° C. for 40 minutes while maintaining the said temperature and then 340 mg. of 3,3-ethylenedioxy - 12β - methyl-Δ$^{5(10),9(11)}$-estradiene-17-one were added thereto. The mixture was stirred for 45 minutes at room temperature and the reaction mixture was added to a saturated aqueous sodium chloride solution. The mixture was extracted with ether and the organic phase was washed with water, dried over sodium sulfate, filtered and evaporated to dryness under reduced pressure. The residue was chromatographed over silica and eluted with a 95.5 mixture of chloroform and acetone. The eluate was evaporated to dryness to obtain 320 mg. of 3,3-ethylenedioxy - 12β - methyl - 17α - ethynyl-Δ$^{5(10),9(11)}$-estradiene-17β-ol which was used as is for the next step.

I.R. Spectrum (chloroform): Presence of OH at 3597 cm.−1, of C≡CH at 3301 cm.−1, of C=C at 1639 and 1601 cm.−1 and of ketal.

U.V. Spectrum (ethanol):

max. at 237 nm.
$$E_{1cm}^{1\%} = 530$$

max. at 243 nm.
$$E_{1cm}^{1\%} = 565; \epsilon = 20{,}000$$

inflex. towards 251–252 nm.
$$E_{1cm}^{1\%} = 370$$

Step E: 12β-methyl-17α-ethynyl-Δ$^{4,9}$-estradiene-1β-ol-3-one

A mixture of 5.1 g of 3,3-ethylenedioxy-12β-methyl-17α-ethynyl-Δ$^{5(10),9(11)}$-estradiene-17β-ol, 102 cc. of 95% ethanol and 10.2 g. of cationic sulfonic exchange resin on a polystyrene base (Redex CF) was refluxed for 2 hours with stirring and the mixture was filtered and the filter was washed with methylene chloride. The filtrate was evaporate to dryness under reduced pressure and the residue was chromatographed over silica and eluated with a 95:5 mixture of chloroform and acetone. The eluate was evaporated to dryness and 1.85 g. of the residue were dissolved in 9.25 cc. of boiling methanol. The volume of the solution was reduced in half and the solution was iced and vacuum filtered. The precipitate was dried to obtain 1.371 g. of 12β-methyl-17α-ethynyl-Δ$^{4,9}$-estradiene-17β-ol-3-one melting at 201° C. and having a specific notation $[\alpha]_D^{20} = -282° \pm 4°$ (C=0.5% in chloroform). The cream colored crystals were soluble in chloroform and ethanol and insoluble in water.

Analysis: $C_{21}H_{26}O_2$; molecular weight=310.42. Calculated (percent): C, 81.24; H, 8.44. Found (percent): C, 81.5; H, 8.1.

I.R. Spectrum (chloroform): Presence of OH at 3600 cm.$^{-1}$, of C≡CH at 3300 cm.$^{-1}$, of complex C=O at 1659 and 1652 cm.$^{-1}$ and C=C at 1608 and 1593 cm.$^{-1}$.

U.V. Spectrum (ethanol):

max. at 215 nm.
inflex. towards 235 nm.
$$E_{1cm}^{1\%} = 193$$
$$E_{1cm}^{1\%} = 151$$

max. at 304 nm.
$$E_{1cm}^{1\%} = 668; \epsilon = 20{,}750$$

EXAMPLE V

Preparation of 12-ethyl-17α-ethynyl-Δ$^{4,9,11}$-estratriene-17α-ol-3-one

Step A: 12α-ethyl-Δ$^{5(10),9(11)}$-estradiene-17β-ol-3-one 1.44 liters of an ethyl magnesium bromide solution (1.1 mole-g. per liter) were diluted with 150 cc. of tetrahydrofuran and after cooling the solution to —23° C., 6.15 g. of cuprous chloride were added thereto. The temperature was held at —20° C. for 15 minutes and then a solution of 33 g. of 17β-acetoxy-Δ$^{4,9,11}$-estratriene-3-one (prepared by process of French Pat. No. 1380414) in 250 cc. of tetrahydrofuran was added thereto. The temperature was allowed to return to 0° C. which was maintained for 1½ hours. The mixture was then cooled to about —40° C. and 950 cc. of 2 N hydrochloric acid were added thereto. The temperature was raised to room temperature and the mixture was extracted with ether. The ether phase was washed with water, dried over sodium sulfate and evaporated to dryness under reduced pressure. The residue was chromatographed over silica and elution with a 2:8 mixture of ethylacetate and benzene. Evaporation of the eluate gave 13.15 g. of 2α-ethyl-Δ$^{5(10),9(11)}$-estradiene-17β-ol-3-one melting at 139° C. The colorless solid was soluble in chlorinated solvents and ethanol and insoluble in water.

I.R. Spectrum (chloroform): Presence of non-conjugated ketone at 1715 cm.$^{-1}$ and of OH.

U.V. Spectrum (ethanol): max. at 242 nm.
$$E_{1cm}^{1\%} = 622$$

R.M.N. Spectrum (Deuterochloroform): 18-methyl at 54.5 Hz., triplet of $CH_3$ of ethyl group towards 74 Hz., triplet of 17–H at 216, 268 and 284 Hz. and 11–H ethylenic proton towards 390 Hz.

Step B: 11β-hydroperoxy-12α-ethyl-Δ$^{4,9}$-estradiene-17β-ol-3-one

A current of oxygen saturated with ethanol was passed through a solution of 13.15 g. of 12α-ethyl-Δ$^{5(10),9(11)}$-estradiene-17β-ol-3-one in 65 cc. of ethanol with 1% of triethylamine overnight at room temperature and after cooling to —5° C., the mixture was vacuum filtered. The recovered precipitate was washed with iced ethanol, then with ether and was dried at room temperature to obtain 10.35 g. of 11β-hydroperoxy-12α-ethyl-Δ$^{4,9}$-estradiene-17β-ol-one melting at 240° C. The colorless solid was insoluble in most of the usual solvents.

Step C: 12α-ethyl-Δ$^{4,9}$-estradiene-11β,17β-diol-3-one 7.5 cc. of trimethyl phosphite were added to a suspension of 10.35 g. of 11β-hydroperoxy-12α-ethyl-Δ$^{4,9}$-estradiene-17β-ol-3-one in 200 cc. of methanol at a temperature below 30° C. and the mixture was then stirred for 20 minutes at 30° C. and was poured over ice. 8.5 cc. of hydrogen peroxide of 110 volume were added to the mixture which was then diluted with water and vauum filtered. The precipitate was washed with water and was dried under reduced pressure to obtain 8.89 g. of 12α-ethyl-Δ$^{4,9}$-estradiene-11β,17β-diol-3-one melting at 230° C. The colorless solid was soluble in alcohols, slightly soluble in chloroform and insoluble in water.

Analysis: $C_{20}H_{28}O_3$; molecular weight=316.42. Calculated (percent): C, 75.91; H, 8.92. Found (percent): C, 75.9; H, 8.9.

I.R. Spectrum (Nujol): Presence of conjugated ketone at 1650 cm.$^{-1}$, of C=C at 1598 cm.$^{-1}$ and of OH.

U.V. Spectrum (ethanol):

max. at 299–300 nm.
$$E_{1cm}^{1\%} = 624 \; \epsilon = 19{,}500$$

R.M.N. Spectrum (dimethylsulfoxide): 18 methyl at 65 Hz. and 4–H at 339 Hz. and 11–H at 284.5 Hz.

Step D: 12-ethyl-Δ$^{4,9,11}$-estratriene-17β-ol-3-one 54 cc. of acetonitrile and 11 cc. of perchloric acid were added to a solution of 17.98 g. of 12α-ethyl-Δ$^{4,9}$-estradiene-11β,17β-diol-3-one in 2.8 liters of methylene chloride and the mixture was stirred for 4 minutes at room temperature and added to water. The mixture was extracted with methylene chloride and the organic phase was washed with water until the wash waters were neutral, dried over sodium sulfate and evaporated to dryness under reduced pressure. The residue was chromatographed over silica and eluted with a 7–3 mixture of benzene and ethyl acetate. After evaporation of the solvent, the residue was empasted with 70 cc. of isopropyl ether and was vacuum filtered. The precipitate was washed with isopropyl ether and was dried at room temperature to obtain 12.63 g. of 12-ethyl-Δ$^{4,9,11}$-estratriene-17β-ol-3-one melting at 130° C. The yellow solid was soluble in most of the usual organic solvents, slightly soluble in isopropyl ether and insoluble in water.

U.V. Spectrum:

max. at 356 nm.
$$E_{1cm}^{1\%} = 1001; \epsilon = 29{,}900$$

I.R. Spectrum (chloroform): Presence of OH and trieneone.

R.M.N. Spectrum (deuterochloroform): 18-methyl at 59.5 Hz., 4–H at 343 Hz. and 11–H at 370.5 Hz.

Step E: 3-methyloximino-12-ethyl-Δ$^{4,9,11}$-estratriene-17β-ol 16 cc. of O-methyl hydroxylamine were added to a solution of 9.88 g. of 12-ethyl-Δ$^{4,9,11}$-estratriene-17β-ol-3-one in 100 cc. of methanol and the reaction mixture was heated under a nitrogen atmosphere to 50° C. for 8 hours with stirring and was then cooled. Water was added to the reaction mixture which was then extracted with methylene chloride. The organic phase was washed with water until the wash waters were neutral, dried over sodium sulfate and distilled to dryness under reduced pressure to obtain 11.32 g. of 3-methyloximino-12-ethyl-Δ$^{4,9,11}$-estratriene-17β-ol which was utilized as is for the next step. The product occurred as a yellow solid soluble in chloroform, toluene and ethanol and insoluble in water.

Step F: 3-methyloximino-12-ethyl-Δ$^{4,9,11}$-estratriene-17-one

A solution of 2.9 g. of aluminum isopropylate in 58 cc. of toluene was added to a mixture of 2.148 g. of 3-methyloximino-12-ethyl-Δ$^{4,9,11}$-estratriene-17β-ol, 107 cc. of toluene and 43 cc. of cyclohexanone from which a few cc. had been distilled and distillation was continued for 1 hour while maintaining a constant volume by the addition of 100 cc. of toluene. After cooling, the mixture was filtered and the filtrate was washed with methylene chloride. The filtrate was concentrated under reduced pressure and the liquid residue was subjected to entrainment with water vapor. The residue was extracted with methylene chloride and the organic phase was washed with water, dried and distilled to dryness under reduced pressure. The residue was chromatographed over silica gel with elution with a 7:3 mixture of benzene and ethyl acetate. Evaporation to dryness of the eluate resulted in 1.49 g. of 3-methyloximino-12-ethyl-Δ$^{4,9,11}$-estratriene-17-one which was used as is for the next step.

Step G: 3-methyloximino-12-ethyl-17α-ethynyl-Δ$^{4,9,11}$-estratriene-17β-ol

A solution of 2.58 g. of potassium tert-butylate in 37 cc. of tetrahydrofuran and 18.5 cc. of hexamethyl-phosphortriamide was cooled under a nitrogen atmosphere to —5 to —10° C. and then a current of acetylene was passed there through for 1 hour. A solution of 1.49 g. of 3-methyloximino-12-ethyl-Δ$^{4,9,11}$-estratriene-17-one in 30 cc. of tetrahydrofuran was added to the reaction mixture which was then agitated while bubbling acetylene and nitrogen therethrough at 0 to 5° C. for 1¾ hours. The reaction mixture was poured into an aqueous saturated ammonium chloride solution. The mixture was extracted with ethyl acetate and the organic phase was washed with water, dried and distilled to dryness under reduced pressure. The residue was chromatographed over silica gel with elution by a 8–2 mixture of benzene-ethyl acetate and evaporation of the solvent resulted in 1.37 g. of 3-methyloximino-12-ethyl-17α-ethynyl-Δ$^{4,9,11}$-estratriene-17β-ol which was used as is for the next step.

I.R. Spectrum: Presence of OH at 3607 cm.$^{-1}$ and of C≡C CH at 3310 cm.$^{-1}$.

Step H: 12-ethyl 17α-ethynyl-Δ$^{4,9,11}$-estratriene-17β-ol-3-one 0.9 cc. of water and then 0.9 cc. of pyruvic acid were added to a solution of 300 mg. of 3-methyloximino-12-ethyl - 17α - ethynyl-Δ$^{4,9,11}$-estratriene-17β-ol in 3 cc. of acetic acid and the solution was heated under a nitrogen atmosphere at 80–85° C. for 1¼ hours. After cooling, the mixture was poured over ice and the mixture was extracted with methylene chloride. The organic phases were washed with an aqueous sodium bicarbonate solution and then water until the wash waters were neutral, dried and concentrated to dryness under reduced pressure. The residue was chromatographed over silica gel and elution was with an 8–2 mixture of benzene-ethyl acetate. The eluate was evaporated to dryness and the residue was passed through a column of magnesium silicate and eluted with methylene chloride containing 2% ethyl acetate and the eluate was evaporated to dryness. The residue was dissolved in a few cc. of methylene chloride and the solution was filtered, concentrated under nitrogen and added to isopropyl ether. Distillation was effected until crystallization started and the mixture was cooled and vacuum filtered. The recovered precipitate was washed with isopropyl ether and dried to obtain 136 mg. of 12-ethyl-17α-ethynyl-Δ$^{4,9,11}$-estratriene-17β-ol - 3 - one melting at 172° C. and having a specific rotation $$[\alpha]_D^{20} = +3.5° \pm 1$$

(c.=1% in ethanol). The yellow solid was soluble in ethanol and chloroform and insoluble in water.

Analysis: $C_{22}H_{26}O_2$; molecular weight=322.43. Calculated (percent): C, 81.95; H, 8.13. Found (percent): C, 81.9; H, 8.1.

U.V. Spectrum: max. at 356 nm.; ε=30,450.

EXAMPLE VI

Preparation of 12-methyl-13β-ethyl-17α-ethynyl-Δ$^{4,9,11}$-gonatriene-17β-ol-3-one Step A: 12α-methyl-13β-ethyl-Δ$^{5(10),9(11)}$-gonadiene-17β-ol-3-one 765 mg. of cuprous chloride in 765 cc. of a 1 M methyl magnesium bromide solution was cooled to —5 to —10° C. and a cooled solution of 50 g. of 13β-ethyl-17β-acetoxy-Δ$^{4,9,11}$-gonatriene-3-one in 400 cc. of tetrahydrofuran was slowly added. The reaction mixture was stirred for 2 hours at —5° C. and then for 15 hours while returning the temperature to room temperature and then 2.5 liters of an acid solution of ammonia chloride were added thereto. The mixture was extracted with methylene chloride and the extracts were washed with water, dried over magnesium sulfate and evaporated to dryness under reduced pressure. The residue was chromatographed over silica gel and eluted with a 6:4 mixture of benzene and ethyl acetate to recover 34.6 g. of 12α-methyl-13β-ethyl-Δ$^{5(10),9(11)}$-gonadiene-17β-ol-3-one.

U.V. Spectrum (ethanol):

max. at 241–242 nm.

$$E_{1cm.}^{1\%} = 594$$

inflex. towards 250 nm.

$$E_{1cm.}^{1\%} = 426$$

I.R. Spectrum (chloroform): Presence of OH at 3550 cm.$^{-1}$ and non-conjugated ketone at 1695 cm.$^{-1}$.

Step B: 11β-hydroperoxy-12α-methyl-13β-ethyl-Δ$^{4,9}$-gonadiene-17β-ol-3-one

Using the procedure of Step B of Example V, 11β-hydroperoxy-12α-methyl - 13β - ethyl-Δ$^{4,9}$-gonadiene-17β-ol-3-one was formed which was characterized by thin layer chromatography with RF=0.23 (support silica gel; eluate: 1–1 benzene-ethyl acetate mixture) and was used as is for next step.

Step C: 12α-methyl-13β-ethyl-Δ$^{4,9}$-gonadiene-11β,17β-diol-3-one

Using the procedure of Step C of Example V, there was obtained a total yield (Steps B and C) of 62.5% of 12α-methyl-13β-ethyl-Δ$^{4,9}$-gonadiene-11β,17β-diol - 3 - one melting at 210° C. The colorless product was soluble in methanol, slightly soluble in chloroform, methylene chloride and isopropyl ether and insoluble in water.

Analysis: $C_{20}H_{28}O_3$; molecular weight=316.4. Calculated (percent): C, 75.91; H, 8.92. Found (percent): C, 75.9; H, 8.9.

U.V. Spectrum (ethanol):

max. at 298 nm.

$$E^{1\%}_{1cm} = 639$$

I.R. Spectrum (chloroform): OH towards 3410 cm.$^{-1}$ and conjugated ketone towards 1640 cm.$^{-1}$.

R.M.N. Spectrum (CDCl$_3$): 4–H at 346.5 Hz., 11–H at 282 Hz., 12–CH$_3$ at 51.5–58.5 Hz. and CH$_3$ of 13-ethyl at 71–78–86 Hz. The constant for the connection of the 11–H and 12–H is very weak but it was confirmed that the 11–H was α and the 12–H was β.

Step D: 12-methyl-13β-ethyl-Δ$^{4,9,11}$-gonatriene-17β-ol-3-one

Using the process of Step D of Example V, dehydration of the product of Step C resulted in a 66% yield of 12-methyl-13β-ethyl-Δ$^{4,9,11}$-gonatriene-17β-ol-3-one melting at 153° C. The yellow product was soluble in methylene chloride, chloroform, ethanol and benzene, slightly soluble in isopropyl ether and insoluble in water.

Analysis: C$_{20}$H$_{26}$O$_2$; molecular weight=298.4. Calculated (percent): C, 80.49; H, 8.78. Found (percent): C, 80.4; H, 8.7.

U. V. Spectrum (ethanol):

max. at 358 nm.

$$E^{1\%}_{1cm} = 987; \epsilon = 29,450$$

I.R. Spectrum (CHCl$_3$): OH toward 3585 cm.$^{-1}$ and conjugated ketone toward 1640 cm.$^{-1}$.

R.M.N. Spectrum (CDCl$_3$): 4–H at 344.5 Hz., 11–H at 380 Hz., 12–CH$_3$ at 122–123.5 Hz. and CH$_3$ of 13-ethyl at 49.5–56.5–63.5 Hz.

Step E: 3,3-ethylenedioxy-12-methylene-13β-ethyl-Δ$^{5(10),9(11)}$-gonadiene-17β-ol A mixture of 6.8 g. of 12-methyl-13β-ethyl-Δ$^{4,9,11}$-gonatriene-17β-ol-3-one, 410 cc. of chloroform, 0.93 g. of phosphoric acid and 51 cc. of ethylene glycol in a balloon flask was refluxed for 48 hours and the glycol was removed by decantation. The resulting organic phase was washed with a saturated aqueous sodium bicarbonate solution and was then evaporated to dryness under reduced pressure. The residue was chromatographed over a silica column and eluted with an 8–2 benzene-ethyl acetate mixture containing 0.1% triethylamine to obtain 4 g. of 3,3-ethylenedioxy - 12 - methylene-13β-ethyl-Δ$^{5(10),9(11)}$-gonadiene-17β-ol in the form of a solid soluble in benzene, ethyl acetate, ethanol and chloroform. Counting the starting material recovered by chromatography, the yield was 69%.

Analysis: C$_{22}$H$_{30}$O$_3$; molecular weight=342.4. Calculated (percent): C, 77.15; H, 8.83. Found (percent): C, 76.8; H, 8.9.

U.V. Spectrum (ethanol):

Max. at 277 nm.

$$E^{1\%}_{1cm} = 805; \epsilon = 27,550$$

I.R. Spectrum (chloroform): OH at 3560 cm.$^{-1}$, ketal, methylene at 891 cm.$^{-1}$, C=C at 1656, 1585 and 1611 cm.$^{-1}$.

R.M.N. Spectrum (DCDl$_3$): 4–H at 137 Hz., 11–H at 391 Hz., 12-methylene at 298–306 Hz. and CH$_3$ of 13-ethyl at 46.5–53–59.5 Hz.

Step F: 3,3-ethylenedioxy-12-methylene-13β-ethyl-Δ$^{5(10),9(11)}$-gonadiene-17-one Using the process described in Step F of Example V, the raw product was purified by vapor entrainment, then chromatography over silica gel and elution with a 1-1 mixture of benzene-ethyl acetate containing 0.1% triethylamine to obtain a 70% yield of 3,3-ethylenedioxy-12-methylene-13β-ethyl-Δ$^{5(10),9(11)}$-gonadiene - 17 - one in the form of a pale yellow solid melting at 135° C. The product was slightly soluble in isopropyl ether and insoluble in water.

Analysis: C$_{22}$H$_{28}$O$_3$; molecular weight=340.4. Calculated (percent): C, 77.61; H, 8.29. Found (percent): C, 77.3; H, 8.4.

U.V. Spectrum (ethanol):

max. at 266–267 nm.

$$E^{1\%}_{1cm} = 800$$

max. at 276–277 nm.

$$E^{1\%}_{1cm} = 1030$$

max. at 287–288 nm.

$$E^{1\%}_{1cm} = 749$$

I.R. Spectrum (chloroform): Ketone at 1733 cm.$^{-1}$, C=C at 1615 and 1633 cm.$^{-1}$ and methylene at 898 and 1806 cm.$^{-1}$.

R.M.N. Spectrum (CDl$_3$): 11–H at 359 Hz., 12-methylene at 304–344 Hz. and CH$_3$ of 13-ethyl at 40–47.5–54 Hz.

Step G.: 3,3-ethylenedioxy-12-methylene-13β-ethyl-17α-ethynyl-Δ$^{5(10),9(11)}$-gonadiene-17β-ol A solution of 0.34 g. of 3,3-ethylenedioxy-12-methylene-13β-ethyl-Δ$^{5(10),9(11)}$-gonadiene-17-one in 3.5 cc. of tetrahydrofuran was added at −50° C. to a solution of 0.41 g. of potassium in liquid ammonia through which acetylene had been bubbled until decolorization occurred and then acetylene was bubbled through the reaction mixture for 21 hours at −50° C. Then, 0.6 g. of ammonium chloride dissolved in 150 cc. of water was added thereto and the mixture was evaporated to dryness under reduced pressure. The residue was subjected to chromatography over silica gel with elution with chloroform containing 0.5% ethanol to obtain 0.13 g. of 3,3-ethylenedioxy-12-methylene-13β-ethyl-17α-ethynyl-Δ$^{5(10),9(11)}$-gonadiene - 17β - ol melting at 185° C. Also recovered was 0.17 of unreacted starting material. The ethynyl product occurred as colorless crystals soluble in methylene chloride, chloroform and ethanol, slightly soluble in isopropyl ether and insoluble in water.

U.V. Spectrum (ethanol):

max. at 277 nm.

$$E^{1\%}_{1cm} = 947; \epsilon = 34,700$$

I.R. Spectrum (CHCl$_3$): OH at 3559 cm.$^{-1}$, C=CH at 3300 cm.$^{-1}$ and methylene at 892 cm.$^{-1}$.

R.M.N. Spectrum (CDCl$_3$): 12-methylene at 310 Hz. and acetylenic hydrogen at 151 Hz.

Step H: 12-methyl-13β-ethyl-17α-ethynyl-Δ$^{4,9,11}$-gonatriene-17β-ol-3-one

A solution of 3.8 g. of raw 3,3-ethylenedioxy-12-methylene-13β-ethyl-17α-ethynyl-Δ$^{5(10),9(11)}$ - gonadiene - 17β-ol (preceding step without chromatography) in 90 cc. of acetic acid containing 25% water was stirred under an inert atmosphere for 21 hours and the reaction mixture was then poured into a liter of water. The mixture was extracted with methylene chloride and the extracts were concentrated to dryness by evaporation under reduced pressure. The residue was chromatographed over silica gel and eluted with an 8-2 mixture of benzene-ethyl acetate to obtain 1.1 g. of 12-methyl-13β-ethyl-17α-ethynyl-Δ$^{4,9,11}$-gonatriene-17β-ol-3-one melting at 124° C. and having a specific rotation $[\alpha]_D^{20} = +150°$ (c.=0.6% in ethanol). The yellow solid was soluble in chloroform, ethyl acetate, ethanol and ethyl ether, slightly soluble in cyclohexane, n-hexane, benzene and isopropyl ether and insoluble in water. The UV, IR and RMN spectrum are in accord with the indicated structure.

PHARMACOLOGICAL STUDY (A) Antigonadotrophic activity

The antigonadotrophic activity was determined on puberic rats weighing about 200 g. and the test compounds, used in solution in sesame oil containing 5% benzylic alcohol, was administered subcutaneously in a volume of 0.2 cc. with 14 treatments in 14 days. On the 15th day, the rats were killed by carotidine bleeding and the seminal vesicules, prostate, testicles and suprenals were removed and weighed. The results are shown in Tables A, B and C.

(C) Estrogenic activity

The estrogenic activity on the vagina was determined with the Allen-Doisy test with a lot of castrated rats which received once a subcutaneous dose of the product in a sesame oil solution containing 5% benzylic alcohol or an

TABLE A

| Lot | Daily dose | Testicles, mg. | Seminal vesicle, mg. | Prostate, mg. | Suprenals, mg. |
|---|---|---|---|---|---|
| Control | 0 | 2,590 | 553.8 | 334.9 | 37.1 |
| 12β-methyl-17γ-ethynyl-Δ⁴,⁹-estradiene-17β-ol-3-one | 100γ | 2,420 | 239.7 (−57%) | 231.4 (−37%) | 41.3 |
|  | 500γ | 1,790 (−31%) | 47.6 (−91%) | 52.5 (−84%) | 73.7 |
|  | 2 mg. | 1,650 (−36%) | 45.8 (−92%) | 45.8 (−86%) | 51.7 |

TABLE B

| Lot | Daily dose | Testicles, mg. | Seminal vesicle, mg. | Prostate, mg. | Suprenals, mg. |
|---|---|---|---|---|---|
| Control | 0 | 2,590 | 553.8 | 334.9 | 37.1 |
| 12-ethyl-17α-ethynyl-Δ⁴,⁹,¹¹-estratriene-17β-ol-3-one | 50γ | 2,610 | 217.5 (−66%) | 236.4 (−29%) | 43.9 |
|  | 200γ | 1,920 (−26%) | 47.5 (−91%) | 63.2 (−81%) | 60.6 |
|  | 1 mg. | 1,790 (−31%) | 44.7 (−92%) | 40.4 (−88%) | 55.3 |

TABLE C

| Lot | Daily dose | Testicles, mg. | Seminal vesicle, mg. | Prostate, mg. | Suprenals, mg. |
|---|---|---|---|---|---|
| Control | 0 | 2,800 | 450.1 | 280.0 | 38.8 |
| 12-methyl-13β-ethyl-17α-ethynyl-Δ⁴,⁹,¹¹-gonatriene-17β-ol-3-one | 10γ | 2,700 | 287.0 (−36%) | 217.4 (−22%) | 45.8 |
|  | 50γ | 2,000 (−28%) | 51.8 (−89%) | 45.4 (−84%) | 62.8 |

The results of Tables A, B and C show that the test compounds have a considerable antigonadotrophic activity without causing any suprenal aplasia.

(B) Uterotrophic activity

The uterotrophic activity used was the test of Rubin [Endocrinology, vol. 49 (1951), p. 429] with female mice 19 to 21 days old. The mice received a single subcutaneous treatment per day for 3 days and were killed on the 4th day. The uterus was removed, dissected and weighed. The products were administered subcutaneously in solution in sesame oil containing 5% benzylic alcohol. The results are reported in Table D.

TABLE D

| Lot | Total doses | Weight of uterus, mg. |
|---|---|---|
| Control | 0 | 8.4 |
| 12β-methyl-17α-ethynyl-Δ⁴,⁹-estradiene-17β-ol-3-one(A) | 3.3γ | 26.7 |
|  | 10γ | 31.1 |
|  | 30γ | 46.2 |
| Control | 0 | 11.7 |
| 12-ethyl-17α-ethynyl-Δ⁴,⁹,¹¹-estratriene-17β-ol-3-one(B) | 10γ | 23.4 |
|  | 30γ | 44.5 |
|  | 90γ | 108.0 |
| Control | 0 | 7.2 |
| 12-methyl-13β-ethyl-17α-ethynyl-Δ⁴,⁹,¹¹-gonatriene-17β-ol-3-one(C) | 0.37γ | 9.2 |
|  | 1.1γ | 16.7 |
|  | 3.3γ | 42.5 |
|  | 10γ | 68.3 |

The results of Table D show that the three products exercise an important uterotrophic activity. Compound C is active at a total dose of 3.3γ, Compound B active at a total dose of 3.0γ and Compound A is active at a total dose of 1.0γ.

oral dose of the product in an olive oil solution. Vaginal smears were taken daily starting the second day after the treatment. The rat unity was the dose of product which provoked estrus in the rat during one day. The results are reported in Table E.

TABLE E

| Product | Orally | Subcutaneously |
|---|---|---|
| 12-methyl-13β-ethyl-17α-ethynyl-Δ⁴,⁹,¹¹-gonatriene-17β-ol-3-one. | 20γ | 10γ |
| 12β-methyl-17α-ethynyl-Δ⁴,⁹-estradiene-17α-ol-3-one. | 200γ | 100γ |
| 12-ethyl-17α-ethynyl-Δ⁴,⁹,¹¹-estratriene-17β-ol-3-one. |  | 50γ |

(D) Exogenic antiandrogenic activity

The exogenic antiandrogenic activity of 12-methyl-17β-acetoxy-Δ⁴,⁹,¹¹-estratriene-3-one was studied in relation with testosterone propionate on castrated male rats using the procedure of Lerner described by Dorfman, in "Methods in Hormone Research," vol. II, p. 320.

Male rats about 4 weeks old were castrated and received the test compounds beginning on the day of castration for 7 days and on the 8th day the animals were killed and the prostate, seminal vesicles and *Levator ani* were examined. The product of the invention was administered subcutaneously in solution in olive oil containing 5% benzyl alcohol at a dose of 1 mg. per day per rat. Testosterone propionate was administered subcutaneously at a dose of 50γ per day per rat. Another group received a subcutaneous administration of 1 mg. of the product of the invention and 50γ of testosterone propionate per day per rat. The results are set forth in Tables F, G and H.

TABLE F

| Treatment | Daily doses | Fresh Levator ani, mg. | Seminal vesicles, mg. | Prostate, mg. |
|---|---|---|---|---|
| Control | 0 | 21.0 | 4.1 | 10.7 |
| Testosterone propionate | 50γ | 34.3 | 48.4 | 86.5 |
| 12-methyl-17β-acetoxy-Δ⁴,⁹,¹¹-estratriene-3-one | 1 mg. | 20.5 | 12.6 | 18.8 |
| 12-methyl-17β-acetoxy-Δ⁴,⁹,¹¹-estratriene-3-one plus testosterone propionate. | 1 mg. plus 50γ | 30.0 | 40.9 | 61.8 |

Table F shows that 12-methyl-17β-acetoxy-$\Delta^{4,9,11}$-estratriene-3-one has a clear antiandrogenic activity at a dose of 1 mg. in relation with 50γ of testosterone propionate and does not show a significant androgenic activity when administered alone at the same dose.

A second test was conducted under similar test conditions and the results of Table G confirm the antiandrogenic activity of 12-methyl-17β-acetoxy-$\Delta^{4,9,11}$-estratriene-3-one.

TABLE G

| Treatment | Daily doses | Fresh Levator ani, mg. | Seminal vesicles, mg. | Prostate, mg. |
|---|---|---|---|---|
| Control | 0 | 17.1 | 9.4 | 14.6 |
| Testosterone propionate | 50γ | 30.2 | 54.5 | 81.0 |
| 12-methyl-17β-acetoxy-$\Delta^{4,9,11}$-estratriene-3-one plus testosterone propionate | 1 mg. plus 50γ | 30.8 | 55.5 | 43.4 (−47%) |

Therefore, the tables F and G clearly show that 12-methyl-17β-acetoxy-$\Delta^{4,9,11}$-estratriene-3-one exhibits a clear inhibitory activity on the androgenic activity of testosterone propionate without noticeably effecting its myotrophic activity.

TABLE H

| Treatment | Daily doses | Fresh Levator ani, mg. | Seminal vesicles, mg. | Prostate, mg. |
|---|---|---|---|---|
| Controls | 0 | 17.5 | 5.2 | 8.5 |
| Testosterone propionate | 50γ | 56.5 | 54.8 | 108.2 |
| 12-methyl-17α-ethynyl-$\Delta^{4,9}$-estradiene-17β-ol-3-one | 1 mg | 13.8 | 17.5 | 22.2 |
| 12-methyl-17α-ethynyl-$\Delta^{4,9}$-estradiene-17β-ol-3-one plus testosterone propionate | 1 mg. plus 50γ | 40.9 | 66.7 | 78.3 |
| Controls | 0 | 18.9 | 9.1 | 11.9 |
| Testosterone propionate | 50γ | 32.1 | 69.4 | 105.3 |
| 12-ethyl-17α-ethynyl-$\Delta^{4,9,11}$-estratriene-17β-ol-3-one | 1 mg | 13.8 | 25.4 | 21.3 |
| 12-ethyl-17α-ethynyl-$\Delta^{4,9,11}$-estratriene-17β-ol-3-one plus testosterone propionate | 1 mg. plus 50γ | 27.5 | 103.0 | 107.9 |
| Controls | 0 | 27.1 | 11.0 | 16.3 |
| Testosterone propionate | 50γ | 42.8 | 102.3 | 99.0 |
| 12-methyl-13β-ethyl-17α-ethynyl-$\Delta^{4,9,11}$-gonatriene-17β-ol-3-one | 1 mg | 16.0 | 23.6 | 20.5 |
| 12-methyl-13β-ethyl-17α-ethynyl-$\Delta^{4,9,11}$-gonatriene-17β-ol-3-one plus testosterone propionate | 1mg. plus 50γ | 22.8 | 92.7 | 92.7 |

These results show that the tested products exhibit no significant inhibiting action with respect to testosterone propionate and that they themselves have no androgenic activity.

Various modifications of the compositions and method of the invention may be made without departing from the spirit or scope thereof and it is to be understood that the invention is to be limited only as defined in the appended claims.

We claim:

1. A compound selected from the group consisting of 12β-alkyl-$\Delta^{4,9}$-gonadienes of the formula

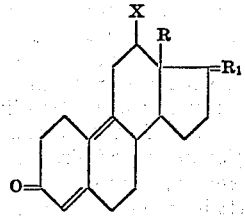

Ia and 12-alkyl-$\Delta^{4,9,11}$-gonatrienes of the formula

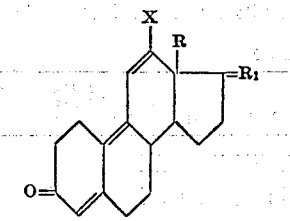

Ib wherein R is alkyl of 1 to 3 carbon atoms, X is alkyl of 1 to 3 carbon atoms and $R_1$ is selected from the group consisting of

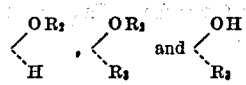

wherein $R_2$ is selected from the group consisting of hydrocarbyl of 1 to 10 carbon atoms and acyl of an organic carboxylic acid of 1 to 18 carbon atoms and $R_3$ is selected from the group consisting of saturated hydrocarbon of 1 to 4 carbon atoms and alkenyl, alkynyl and haloalkynyl of 2 to 4 carbon atoms.

2. Compounds of claim 1 which are the 12β-alkyl-$\Delta^{4,9}$-gonadiene of the formula

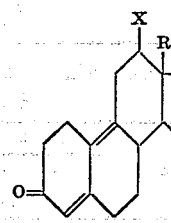

wherein R, $R_1$ and X have the definition of claim 1.

3. Compound of claim 1 which are 12-alkyl-$\Delta^{4,9,11}$-gonatrienes of the formula

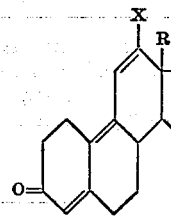

wherein R, $R_1$ and X have the definitions of claim 1.

4. A compound of claim 2 which is 12β-methyl-17α-ethynyl-$\Delta^{4,9}$-estradiene-17β-ol-3-one.

5. A compound of claim 3 which is 12-methyl-13β-ethyl-17α-ethynyl-$\Delta^{4,9,11}$-gonatriene-17β-ol-3-one.

6. A compound of claim 3 which is 12-ethyl-17α-ethynyl-Δ$^{4,9,11}$-estratriene-17β-ol-3-one.

7. A compound of claim 3 which is 12-methyl-17β-acetoxy-Δ$^{4,9,11}$-estratriene-3-one.

8. A compound of claim 3 which is 12-methyl-17α-ethynyl-Δ$^{4,9,11}$-estratriene-17β-ol-3-one.

9. A compound of claim 3 which is 12, 17α-dimethyl-Δ$^{4,9,11}$-estratriene-17β-ol-3-one.

10. A process for the preparation of a compound of claim 3 wherein $R_1$ is

comprising reacting a 13β - R-Δ$^{4,9,11}$-gonatriene-17β-ol-3-one or its 17β-ester with an organometallic compound selected from the group consisting of an XLi and XMg-Hal wherein the organo portion is X as defined above and Hal is a halogen to obtain the corresponding 12α-X-13β-R-Δ$^{5(10),9(11)}$-gonadiene-17β-ol-3-one, reacting the latter with oxygen to form the corresponding 11β-hydroperoxy-12α-X-13β-R - Δ$^{5(10),9(11)}$-gonadiene-17β-ol-3-one, reacting the latter with a reducing agent to obtain the corresponding 12α-X-13β-R-Δ$^{4,9}$-gonadiene-11β,17β - diol-3-one, reacting the latter with a dehydrating agent to form the corresponding 12-X-13β - R - Δ$^{4,9,11}$-gonatriene-17β-ol-3-one, reacting the latter with a compound selected from the group consisting of hydroxylamine and O-lower alkyl-hydroxylamine to protect the 3-keto group and to form the corresponding 3 - oximino-12-X-13β-R-Δ$^{4,9,11}$-gonatriene-17β-ol-3-one, reacting the latter with an oxidation agent to form the corresponding 3-oximino-12-X-13β-R-Δ$^{4,9,11}$-gonatriene-17-one, reacting the latter with an organometallic reagent selected from the group consisting of $R_3$Li and $R_3$Mg Hal where the organo is $R_3$ and Hal is halogen to form the corresponding 3-oximino-12-X-13β-R-17α-$R_3$-Δ$^{4,9,11}$-gonatriene-17β-ol and subjecting the latter to acid hydrolysis or an exchange reaction with a carbonyl derivative selected from the group consisting of glyoxylic acid, glyoxal, formol and pyruvic acid to obtain the corresponding 12-X-13β-R-17α-$R_3$-Δ$^{4,9,11}$-gonatriene-17β-ol-3-one.

11. A process for the preparation of a compound of claim 3 wherein $R_1$ is

comprising reacting a 12-X-13β-R-Δ$^{4,9,11}$-gonatriene-17β-ol-3-one with a ketalization agent selected from the group consisting of lower alkanol, lower alkylene glycol and dioxolane in the presence of an acid catalyst to form the corresponding 3-$K_1$-12-$X^1$-13β-R-Δ$^{5(10),9(11)}$ - gonadiene-17β-ol- wherein $K_1$ is a ketal group, $X^1$ is an alkylidene of 1 to 3 carbon atoms, reacting the latter with an oxidation agent to form the corresponding 3-$K_1$-12-$X^1$-13β-R-17α-$R_3$-Δ$^{5(10),9(11)}$-gonadiene-17β-ol and subjecting the latter to acid hydrolysis to form the corresponding 12-X-13β-R-17α-$R_3$-Δ$^{4,9,11}$-gonatriene-17β-ol-3-one of claim 3.

12. A process for the preparation of a 12β-alkyl steroid of claim 2 wherein $R_1$ is

comprising hydrogenating a 12-X-13β-R-Δ$^{4,9,11}$-gonatriene-17β-ol-3-one in the presence of a catalyst to form the corresponding 12β-X-13β-R-gonadiene-17β-ol-3-one where the double bonds may be Δ$^{4,9}$ and/or Δ$^{5(10),9(11)}$, reacting the latter a ketalization agent selected from the group consisting of lower alkanol, lower alkylene glycol and dioxolane in the presence of an acid catalyst to form the corresponding 3-K-12β-X-13β-R-gonadiene-17β-ol wherein K is the protected ketone, reacting the latter with an oxidation agent to form the corresponding 3-K-12β-X-13β-R-gonadiene-17-one, reacting the latter with an organometallic agent selected from the group consisting of $R_3$Li and $R_3$Mg Hal where the organo is $R_3$ and Hal is halogen to form the corresponding 3-K-12β-X-13β-R-17α-$R_3$-gonadiene-17β-ol and reacting the latter with an acid or a carbonyl exchange derivative selected from the group consisting of pyruvic acid, glyoxal, formol and glyoxylic acid to form the corresponding 12β-X-13β-R-17α-$R_3$-Δ$^{4,9}$-gonadiene-17β-ol-3-one of claim 3.

13. A compound of the formula

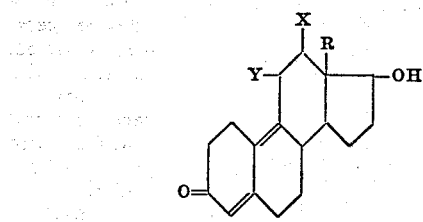

wherein Y is selected from the group consisting of hydroxy and hydroperoxy and X and R are alkyl of 1 to 3 carbon atoms.

14. A compound of claim 13 which is 12α-ethyl-11β-hydroperoxy-Δ$^{4,9}$-estradiene-17β-ol-3-one.

15. A compound of claim 13 which is 11β-hydroperoxy-12α-methyl-13β-ethyl - Δ$^{4,9}$ - gonadiene-17β-ol-3-one.

16. A compound of claim 13 which is 12α-ethyl-Δ$^{4,9}$-estradiene-11β,17β-diol-3-one.

17. A compound of claim 13 which is 12α-methyl-13β-ethyl-Δ$^{4,9}$-gonadiene-11β,17β-diol-3-one.

18. A compound of the formula

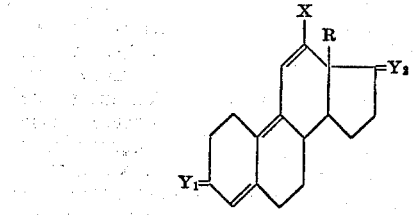

wherein X and R are alkyl of 1 to 3 carbon atoms and $Y_1$ is =O when $Y_2$ is

and $Y_1$ is =NOZ when $Y_2$ is selected from the group consisting of

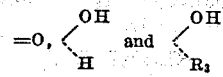

Z is selected from the group consisting of hydrogen and lower alkyl and $R_3$ is a hydrocarbon of 1 to 6 carbon atoms.

19. A compound of claim 18 which is 12-ethyl-Δ$^{4,9,11}$-estratriene-17β-ol-3-one.

20. A compound of claim 18 which is 12-methyl-13β-ethyl-Δ$^{4,9,11}$-gonatriene-17β-ol-3-one.

21. A compound of claim 18 which is 3-methyloximino-12-ethyl-Δ$^{4,9,11}$-estratriene-17β-ol.

22. A compound of claim 18 which is 3-methyloximino-12-ethyl-Δ$^{4,9,11}$-estratriene-17-one.

23. A compound of claim 18 which is 3-methyloximino-12-ethyl-17α-ethynyl-Δ$^{4,9,11}$-estratriene-17β-ol.

24. A compound of claim 18 which is 12-methyl-Δ$^{4,9,11}$-estratriene-17β-ol-3-one.

25. A compound of claim 18 which is 3-oximino-12-methyl-Δ$^{4,9,11}$-estratriene-17β-ol.

26. A compound of claim 18 which is 3-oximino-12-methyl-Δ$^{4,9,11}$-estratriene-17-one.

27. A compound of claim 18 which is 3-oximino-12,17α-dimethyl-Δ$^{4,9,11}$-estratriene-17β-ol.

28. A compound of claim 18 which is 3-oximino-12-methyl-17α-ethynyl-Δ$^{4,9,11}$-estratriene-17β-ol.

29. A compound of the formula

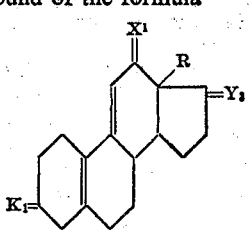

wherein R is alkyl of 1 to 3 carbon atoms, $X^1$ is alkylidene of 1 to 3 carbon atoms, $K_1$ is a ketal and $Y_3$ is selected from the group consisting of

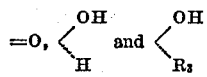

and $R_3$ is a hydrocarbon of 1 to 6 carbon atoms.

30. A compound of claim 29 which is 3,3-ethylenedioxy-12-methylene - 13$\beta$ - ethyl - $\Delta^{5(10),9(11)}$ - gonadiene-17$\beta$-ol.

31. A compound of claim 30 which is 3,3-ethylenedioxy-12-methylene-13$\beta$-ethyl - $\Delta^{5(10),9(11)}$ - gonadiene-17-one.

32. A compound of claim 29 which is 3,3-ethylenedioxy-12-methylene-13$\beta$-ethyl - 17$\alpha$ - ethynyl-$\Delta^{5(10),9(11)}$-gonadiene-17$\beta$-ol.

References Cited
UNITED STATES PATENTS

| | | | |
|---|---|---|---|
| 3,519,654 | 7/1970 | Bertin et al. | 260—397.45 |
| 3,502,699 | 3/1970 | Hughes et al. | 260—397.45 |
| 3,576,828 | 4/1971 | Anner et al. | 260—397.3 |
| 3,697,511 | 10/1972 | Bucourt | 260—397.45 |

FOREIGN PATENTS

| | | | |
|---|---|---|---|
| 1,048,231 | 11/1966 | Great Britain | 260—397.45 |

ELBERT L. ROBERTS, Primary Examiner

U.S. Cl. X.R.

260—397.3, 397.45, 397.5

146.397-1  CAM:cb

PO-1050
(5/69)

UNITED STATES PATENT OFFICE
CERTIFICATE OF CORRECTION

Page 1 of 2

Patent No. 3,810,885                    Dated May 14, 1974

Inventor(s) ROBERT BUCOURT, ANDRE PIERDET, JEAN-CLAUDE GASC and
LUCIEN NEDELEC

It is certified that error appears in the above-identified patent and that said Letters Patent are hereby corrected as shown below:

| IN THE PATENT | | APPLICATION | | |
|---|---|---|---|---|
| Col. | Line | Page | Line | |
| 1 | | | | Left out second priority No and Date.<br>--17-17147 filed May 12,1971-- |
| 5 | 47 | 10 | 24 | After "oxidation" insert<br>--agent to form the corresponding 3-K-12-X-13β-R-Δ$^{5(10),9(11)}$ |
| 8 | 5 | 15 | 10 | |

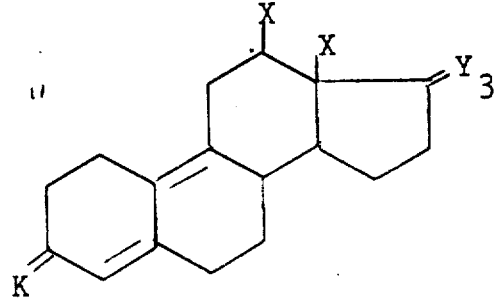

should be

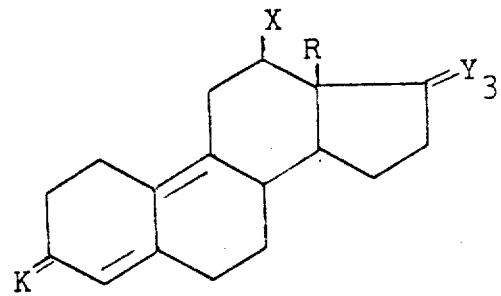

FO-1050
(5/69)

146.397-1  CAM:cb

UNITED STATES PATENT OFFICE
CERTIFICATE OF CORRECTION   Page 2 of 2

Patent No. 3,810,885          Dated May 14, 1974

Inventor(s) ROBERT BUCOURT, ANDRE PIERDET, JEAN-CLAUDE GASC and LUCIEN NEDELEC

It is certified that error appears in the above-identified patent and that said Letters Patent are hereby corrected as shown below:

| IN THE PATENT | | APPLICATION | | |
|---|---|---|---|---|
| Col. | Line | Page | Line | |
| 12 | 63 | 25 | 16 | "ethnnyl" should be --ethynyl-- |
| 13 | 75 | 28 | 7 | "$1620^{cm-1}$" should be --$1602^{cm-1}$-- |
| 14 | 74 | 30 | 14 | "C=CH" should be --C≡CH-- |
| 15 | 11 | 30 | 20 | "1β" should be --17β-- |
| 16 | 30 | 33 | 24 | "vauum" should be --vacuum-- |

Signed and sealed this 26th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,810,885                   Dated May 14, 1974

Inventor(s) Robert Bucourt et al.

It is certified that error appears in the above-identified patent and that said Letters Patent are hereby corrected as shown below:

On the Cover Sheet, after line 11, the following should be added:

-- application France, Dec. 12, 1967, 131,869 --.

Signed and sealed this 6th day of May 1975.

(SEAL)
Attest:

RUTH C. MASON
Attesting Officer

C. MARSHALL DANN
Commissioner of Patents
and Trademarks